United States Patent [19]
Dahlman et al.

[11] 3,811,694
[45] May 21, 1974

[54] COLLET CHUCK

[75] Inventors: George L. Dahlman, Birch Run; Leon O. Kern, Frankenmuth, both of Mich.

[73] Assignee: Houdaille Industries, Inc., Buffalo, N.Y.

[22] Filed: May 31, 1972

[21] Appl. No.: 258,408

[52] U.S. Cl. .................. 279/83, 279/87, 279/48
[51] Int. Cl. .......................................... B23b 31/04
[58] Field of Search ...... 279/83, 82, 48, 1 ME, 103, 279/1 K, 76, 87; 287/52.04, 52.08, 53 LK

[56] References Cited
UNITED STATES PATENTS

| 2,529,396 | 11/1950 | Hunt | 279/1 ME |
|---|---|---|---|
| 3,618,962 | 11/1971 | Cox | 279/82 |
| 3,556,540 | 11/1971 | Benjamin et al. | 279/76 X |
| 2,857,166 | 10/1958 | Conn et al. | 279/83 |
| 2,338,626 | 1/1944 | Emtick | 279/83 |
| 2,475,042 | 7/1949 | McCloskey | 287/53 LK |

*Primary Examiner*—Andrew R. Juhasz
*Assistant Examiner*—Z. R. Bilinsky
*Attorney, Agent, or Firm*—Hill, Sherman, Meroni, Gross & Simpson

[57] ABSTRACT

A collet chuck includes a body, a tapered collet received therein for receiving the shank of a tool, a nut acting between the body and the collet, axially slidable key means for effecting a positive drive from the body to the tool, and an axially adjustable end stop for being engaged by the end of the tool, said end stop being connected to the axially slidable key means.

15 Claims, 1 Drawing Figure

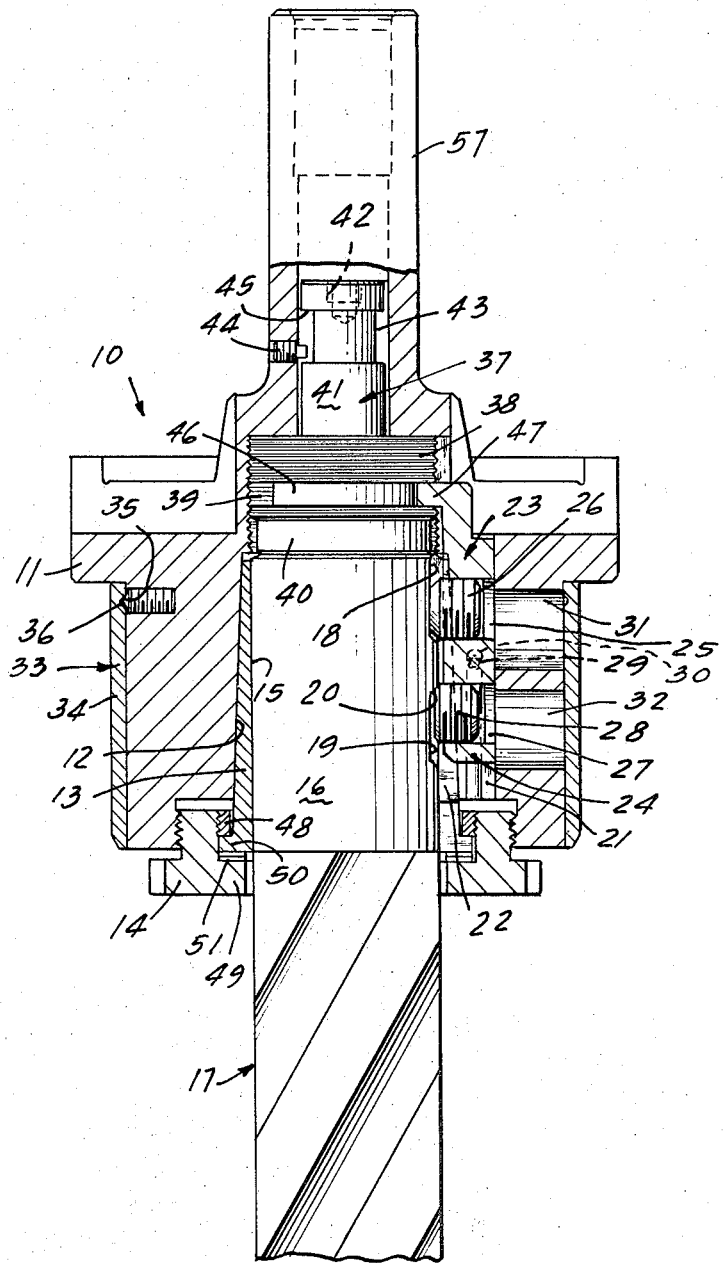

COLLET CHUCK

BACKGROUND OF THE INVENTION

1. Field of the Invention

This invention relates to a collet chuck which is receptive of the cylindrical shank of a tool and which has both the feature of a positive drive connection with the tool and axial adjustability of the tool.

2. Prior Art

Tool holders have in the past been provided with adjustable means for fixing the axial location of a tool, such tool holder including a tapered collet which is actuated by a separate nut. With such construction, the action or effect of the nut in compressing the collet also tends to place a very high force on the positioning means, and if such positioning means does not yield in response to such force, there is a likelihood that the collet will not apply full clamping force on the tool shank, enabling it to slip.

Also it has been known heretofore to utilize a tool such as an end mill having a Weldon-type shank in a tool holder that has means for axially adjusting the position of the tool therein, but all such devices have necessitated the use of a separate adapter which is fixedly secured to the tool, such adapter being thereafter the item that is adjusted.

Further, it has been known heretofore to use keying which acts on a flat surface on the side of a tool shank. Heretofore, such keying has been so arranged as to provide tool retention.

SUMMARY OF THE INVENTION

The new collet chuck includes keying which not only retains the tool, but which also provides a positive drive of the tool, and to this end, key means are provided in aligned slots in the body and in the collet which are receivable in a slot or against a flat surface of the tool shank, independent of the tightness of the nut. The key means are axially slidable and have a connection with an axially adjustable end stop.

Accordingly, an object of the present invention is to provide a collet chuck wherein provision is made for positive rotational driving of the tool.

A further object of the present invention is to provide a collet chuck wherein the position of the tool may be axially adjusted to a selected effective length without altering the point at which key means engage the tool shank.

A further object of the present invention is to provide a tool holder for a tool having a Weldon-type shank which eliminates the need for an adapter while retaining the feature of axial adjustability.

Yet a further object of the present invention is to provide a collet chuck wherein axial adjustment means are so arranged that in the event of any incomplete collet clamping, there is no tendency for the tool to slip.

Yet another object of the present invention is to provide a collet chuck that includes the feature of a positive drive as well as axial tool adjustability.

Another object of the present invention is to provide a collet chuck having axial tool adjustability wherein the structure for effecting such adjustment is accessible when the device is assembled, and which preferably includes a positive drive feature.

A still further object of the present invention is to provide a collet chuck that can be utilized to advantage in combination with a certain configuration of tool shank, which has been constructed to a certain industry standard, and which includes a pair of axially spaced flat surfaces or slots on the side of the tool shank.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING:

The single FIGURE is a cross sectional view of a collet chuck provided in accordance with the present invention.

AS SHOWN ON THE DRAWING:

The principles of this invention are particularly useful when embodied in a collet chuck such as that illustrated by the drawing, generally indicated by the numeral 10. The collet chuck includes a body 11 having an axial opening that is tapered at one end 12 within which there is disposed a correspondingly tapered collet 13 which is moved into and out of the end 12 by a nut 14. The collet 13 has a cylindrical bore 15 receptive of the shank 16 of a tool 17. As is known heretofore, the shank of the tool 16 has at one side a transverse slot 18 which extends to the upper end of the tool as shown, and a second transverse slot 19 axially spaced therefrom, the upper end of the slot 19 including a cam surface 20 formed as a beveled edge at the upper end of the slot 19.

The body 11 has an axially elongated slot 21 which extends from the inner or upper end of the nut 14 upwardly to a point beyond the upper end of the tool shank 16. Correspondingly therewith, the collet also has an axially elongated slot 22 aligned with the slot 21 and which extends through the entire length of the collet 13.

A key means 23 is disposed in the slots 18, 21 and 22 and is shiftable axially therein. The key means 23 includes a key 24 disposed in the slots 21, 22 and has a snug sliding fit therewith. The key 24 is provided with a partially threaded radial aperture 25 within which there is disposed a drive screw 26 which extends into the slot 18. The upper end of the body 11 is adapted as at 57 to be rotated by the spindle of a machine tool, and the rotational force is thus positively transferred by the structure that defines the slot 21 to the key 24, which positively transfers such driving force to the collet structure that defines the slot 22 and to the tool shank structure that defines the slot 18.

The key 24 has a second partially threaded radial aperture 27 within which there is disposed a further screw 28 which has an inner end that acts against the cam surface 20 for providing an axial vector through the cam surface 20 to positively shift the tool 17 in an axial direction, in this instance, upwardly. The partial threading of the apertures 25, 27 prevents undue retraction of the screws 26, 28.

In order to make certain that the key means 23 does not fall into the inside of the collet 13 when there is no tool 17 present, a pin 29, such as a spring-loaded ball assembly is provided which is threaded into the key 24 and which projects into at least one axial slot 30 of semi-circular cross-section in the body 11, the axially inner end of the slot 30 being closed as shown and normally not engaged by the pin 29.

The body 11 has a pair of oval shaped holes 31,32 respectively registering with the screws 26,28, the elongation being in the axial direction, and the lesser dimension of each of the openings 31,32 being smaller than the diameter of the apertures 25,27. In addition, closing means 33 are provided which includes a tubular sleeve 34 that has an internal groove 35 which is receptive of a spring loaded detent 36. The tubular sleeve 34 can be slipped axially off the body 11 to obtain access to the apertures 31,32 for adjusting the screws 26,28. When adjustment is complete, the sleeve 34 can be reinserted, upwardly, with any angular orientation with respect to the body 11, and become snapped in place with the apertures 31,32 closed.

Within the central portion of the axial opening in the body 11, there is provided an axially adjustable end stop 37. The end stop has axially spaced portions of various diameters. Its largest diameter is threaded at 38 and the threads mate with corresponding threads 39 in the axial bore of the body 11. Below the threads there is a cylindrical portion 40 which serves as an abutment structure that contacts the end of the shank 16 directly. Above the threaded portion 38, there is an elongated cylindrical portion 41 which is adapted to receive an adjusting tool at 42 and which has a circumferential slot 43 which is receptive of the inner end of a pin 44. As drawn, the end stop 37 is shown in its fully retracted or upper position, and the threads 39 have sufficient extent so that the desired range of adjustment is obtained. To limit the range of adjustment, the inner end of the pin 44 engages an annular shoulder 45 that defines the upper end of the recess 43. The cylindrical portion 40 is sized to enter the collet 13, and the stop means 44,45 prevents the lower end of the threads 38 from engaging the upper or inner end of the collet 13. The end stop 37 has a further circumferential groove 46 within the threaded portion 38 and the key 24 has an upwardly and radially inwardly extending lip 47 received in the groove 46 and having a snug fit with the sides of the groove. By the connecting means 46,47 the key means 23 is rendered comovable with the end stop 37. Thus the body slot 21 communicates with the circumferential groove 46 to receive and accommodate the axially shiftable key means 23.

When the device is assembled as shown, the end stop 37 can be readily reached through the upper end of the axial opening in the body 11 so that a tool inserted into the opening 42, which may be hexagonal, can effect axial adjustment of the tool length with the device assembled. The limiting means 44,45 thus have a further function in that they prevent the lower end of the key 24 from engaging the upper or inner end of the nut 14.

The nut 14 has a circumference which is adapted to receive an appropriate wrench as is conventional. In addition, it has a tubular portion having external threads that mate with corresponding threads in the body 11, and which has internal threads which in this embodiment receive a lock ring 48. A central flange 49 on the nut 14 acts on the outer end of the collet 13 to force it into the opening 12, and the ring 48 acts on a flange 50 when the nut 14 is screwed out of the body 11 to positively draw the collet 13 from the opening 12. If desired, antifriction means 51 may be employed between the flanges 49 and 50.

To utilize the collet chuck 10, the end stop 37 is usually prepositioned approximately in the midrange of its travel. With the nut 14 loosened, the tool is inserted into the collet 13 against the end stop 37. The screw 28 is partially tightened to urge the shank 16 against the cylindrical portion 40 of the end stop 37 and then the nut 14 is partially tightened. At this point, the end stop 37 is rotated in either direction to move the tool axially to achieve the desired setting or overall length of the device, and when that length is obtained, that nut 14 is fully tightened, and then the set screws 26 and 28 are fully tightened. Readjustment of the overall length can be done by loosening the nut 14, turning the end stop 37 in or out, and retightening the nut 14.

The positive drive connection is obtained by the screw 26 acting against the flat slot 18, and such positive rotational drive connection is maintained, even when the nut 14 is loose. With this arrangement, the positive rotational drive connection is not dependent upon the tightness of the nut 14.

Also, with the end stop 37, the keying 23 and the tool 17 disposed in an axially selected position, the collet 13 can be moved axially, such as for clamping, without disturbing the key means 23. With this arrangement, the position of the key means 23 with respect to the shank 16 is always fixed, and is always the same for various positions of the end stop 37.

Although various minor modifications may be suggested by those versed in the art, it should be understood that we wish to embody within the scope of the patent warranted hereon, all such embodiments as reasonably and properly come within the scope of our contribution to the art.

The terms "axially" and "radially" as used herein refer to the direction of the rotational axis of the collet chuck 10.

We claim as our invention:

1. A collet chuck comprising:
   a. a body having an axial opening;
   b. a collet receptive of the shank of a tool and disposed in said axial opening;
   c. a nut acting between said body and said collet;
   d. a key disposed remotely from said nut in aligned longitudinal slots in said body and said collet and receivable in a further slot in the tool shank for providing a positive rotational driving connection from said body to the tool independent of the tightness of said nut, said key having at least one threaded radial aperture; and
   e. a screw disposed in said radial aperture and extendable into and retractable from said further slot.

2. A collet chuck according to claim 1 including an access opening aligned with said screw, and means for preventing retraction of said screw out of said body.

3. A collet chuck according to claim 2 including means on said body closing said access opening.

4. A collet chuck according to claim 3 in which said closing means comprises a tubular sleeve, and a detent acting between said tubular sleeve and said body.

5. A collet chuck according to claim 1 in which said key has a second radial aperture and a second screw disposed therein, said second screw being extendable to engage a cam surface on the tool shank for providing a force to the tool with an axial vector.

6. A collet chuck according to claim 1 in which said key is axially slidable in said slots, and including a. an axially adjustable end stop disposed in said body opening for being engaged by the end of the tool shank; and b. a connection between said key and said end stop by which they are comovable axially;

whereby said screw will engage the tool shank at the same place for various positions of said end stop.

7. A collet chuck comprising:

a. a body having an axial opening;

b. a collet receptive of the shank of a tool and disposed in said axial opening;

c. a nut acting between said body and said collet;

d. axially slidable key means for projecting radially inwardly through said collet into a slot in the tool shank;

e. an axially adjustable end stop disposed in said body opening for being engaged by the end of the tool shank; and f. a connection between said key means and said end stop by which they are comovable axially;

whereby said key means will engage the tool shank at the same place for various positions of said end stop.

8. A collet chuck according to claim 7 in which said end stop is threaded to said body and has a circumferential groove, said body having a slot in which said key means are disposed, said body slot communicating with said circumferential groove, said keying means having a lip projecting into said groove.

9. A collet chuck according to claim 7 including means acting between said body and said adjustable end stop to keep said end stop axially away from said collet.

10. A collet chuck according to claim 7 including means acting between said body and said adjustable end stop to keep said key means axially away from said nut.

11. A collet chuck according to claim 7 in which said end stop is threaded to said body and has a circumferential groove, and a pin carried by the body and having an inner end disposed in said groove, said groove having an axial extent several times greater than said inner end.

12. A collet chuck according to claim 7 in which said end stop is adapted to be adjusted by means of a tool inserted in said opening from the end remote from the collet.

13. A collet chuck according to claim 7 in which said key means key together said body, said collet and the tool for corotation.

14. A collet chuck according to claim 13 in which said end stop is accessible for adjustment when the tool is assembled therewith.

15. A collet chuck according to claim 7 in which said end stop has an adjustment range enabling a portion of said end stop to be disposed within said collet.

* * * * *